United States Patent
Korst et al.

(10) Patent No.: US 10,404,824 B2
(45) Date of Patent: Sep. 3, 2019

(54) AUTOMATIC DETERMINATION OF GENRE-SPECIFIC RELEVANCE OF RECOMMENDATIONS IN A SOCIAL NETWORK

(75) Inventors: Jan Korst, Eindhoven (NL); Mauro Barbieri, Eindhoven (NL); Serverius Petrus Paulus Pronk, Vught (NL)

(73) Assignee: FUNKE DIGITAL TV GUIDE GMBH, Berlin (DE)

( * ) Notice: Subject to any disclaimer, the term of this patent is extended or adjusted under 35 U.S.C. 154(b) by 258 days.

(21) Appl. No.: 14/131,510

(22) PCT Filed: Jul. 13, 2012

(86) PCT No.: PCT/EP2012/063859
§ 371 (c)(1),
(2), (4) Date: Jan. 8, 2014

(87) PCT Pub. No.: WO2013/014011
PCT Pub. Date: Jan. 31, 2013

(65) Prior Publication Data
US 2014/0136621 A1    May 15, 2014

(30) Foreign Application Priority Data
Jul. 22, 2011  (EP) .................................. 11175096

(51) Int. Cl.
*H04L 29/08* (2006.01)
*G06Q 30/06* (2012.01)
*G06Q 50/00* (2012.01)

(52) U.S. Cl.
CPC ....... *H04L 67/306* (2013.01); *G06Q 30/0631* (2013.01); *G06Q 50/01* (2013.01)

(58) Field of Classification Search
CPC .. G06Q 50/01; G06Q 30/02; G06F 17/30772; G06F 17/30867; G06F 17/30053;
(Continued)

(56) References Cited

U.S. PATENT DOCUMENTS

| | | | | |
|---|---|---|---|---|
| 2003/0055516 A1* | 3/2003 | Gang | ................ | G06F 17/30017 700/94 |
| 2004/0107821 A1* | 6/2004 | Alcalde | ................ | G10H 1/0058 84/608 |

(Continued)

FOREIGN PATENT DOCUMENTS

| | | |
|---|---|---|
| CN | 101490664 A | 7/2009 |
| CN | 101556622 A | 10/2009 |

(Continued)

*Primary Examiner* — William G Trost, IV
*Assistant Examiner* — Imran Moorad
(74) *Attorney, Agent, or Firm* — Ware, Fressola, Maguire & Barber LLP (57) ABSTRACT

The present invention relates to an operating method of operating a recommender system, a filtering apparatus (260) for a recommender system (200), a recommender system and a corresponding computer program. An idea of the invention is to automatically learn for a user A in a social network, which recommendations of contacts of user A, who are also members of the social network, are relevant with respect to a genre into which user A is interested in. A learning algorithm is used to interpret feedback from user A in response to receiving recommendations from his/her contacts. Thereby, for each combination of a contact and a genre, a relevance-taste index can be determined. The determined relevance-taste index is subjected to a filter. Only such recommendations are provided to user A, whose associated relevance-taste indices fulfill a filtering criterion. Thereby, the amount of irrelevant recommendations submitted to user A can be significantly reduced.

16 Claims, 2 Drawing Sheets

(58) Field of Classification Search
CPC ......... G06F 17/30766; G06F 17/30017; G06F 17/30743; G06F 17/30752; H04N 21/8113; H04N 21/4825; G10H 2250/151; G10H 1/0008; G10H 2240/305; G10H 2250/311; G10H 2240/061; G10H 2240/081; G10H 1/0058
USPC .......................................... 709/204; 715/700
See application file for complete search history.

(56) References Cited

U.S. PATENT DOCUMENTS

| | | | |
|---|---|---|---|
| 2005/0171955 A1 | 8/2005 | Hull et al. | |
| 2006/0250994 A1* | 11/2006 | Sasaki ................. | H04L 67/00 370/264 |
| 2008/0250312 A1* | 10/2008 | Curtis .................. | G06Q 10/00 715/700 |
| 2009/0077220 A1* | 3/2009 | Svendsen ............. | G06Q 30/02 709/224 |
| 2009/0125588 A1* | 5/2009 | Black ................... | G06Q 10/107 709/204 |
| 2010/0228590 A1 | 9/2010 | Muller et al. | |
| 2010/0262658 A1* | 10/2010 | Mesnage .............. | G06Q 10/06 709/204 |
| 2012/0078830 A1* | 3/2012 | Bodor .................. | G06Q 30/02 706/46 |
| 2013/0218961 A1* | 8/2013 | Ho ....................... | G06Q 30/02 709/204 |

FOREIGN PATENT DOCUMENTS

| | | | | |
|---|---|---|---|---|
| CN | 101826114 A | 9/2010 | | |
| CN | 102110098 A | 6/2011 | | |
| RU | 2420908 C2 | 6/2011 | | |
| WO | WO 0193571 A2 * | 12/2001 | ............. | H04N 7/163 |
| WO | 2006/056908 A2 | 6/2006 | | |
| WO | 2010/122448 A1 | 10/2010 | | |

* cited by examiner

AUTOMATIC DETERMINATION OF GENRE-SPECIFIC RELEVANCE OF RECOMMENDATIONS IN A SOCIAL NETWORK

CROSS REFERENCE TO RELATED APPLICATIONS

This application is the U.S. National Stage of International Application Number PCT/EP2012/063859 filed on Jul. 13, 2012 which was published in English on Jan. 31, 2013 under International Publication Number WO 2013/014011. This application also claims priority under 35 USC § 119 to European Patent Application No. 11175096.4 filed on Jul. 22, 2011. Both applications are hereby incorporated by reference in their entirety.

FIELD OF THE INVENTION

The present invention relates to a method of operating a personal recommender system configured for being coupled to a computer implemented social network. The present invention furthermore relates to a corresponding computer program and to a filter apparatus for filtering recommendations. In particular, the present invention relates to a recommender system being configured to present filtered recommendations to a user that have been filtered based on their respective relevance.

BACKGROUND OF THE INVENTION

Recommender systems are used for automatically presenting a recommendation relating to a content item, such as a product, a video, a journal, a TV program, a song etc. available online, to a user. As a user is confronted with a large amount of content items that are offered in various databases, he/she can have severe difficulties in finding content items of interest. A recommender system shall facilitate retrieving content items that are of interest for the user and avoid the need to perform complex searches. For instance, international patent application publication WO 2010/122448 A1 describes such a recommender system.

There are different approaches of designing a recommender system. One approach results in a content-based recommender system and another approach in a collaborative-filtering-based recommender system.

A content-based recommender system recommends a content item being represented as multiple features to a user, if this feature representation corresponds to the user's preferences, which are also expressed in terms of these features.

A collaborative-filtering-based recommender system analyses the purchase/viewing/listening history of a comparatively large set of users in order to identify a similarity between content items and a similarity between users. For instance, new content items offered in a content item database that are similar to items that a user likes are recommended to the user. Or, new items that are liked by some users that are similar to a certain user are recommended to the certain user. Usually, a collaborative-filtering-based recommender system does not require specific information on content items themselves other than purchase/viewing/listening information from users.

Besides recommendations that are solely and automatically generated by recommender systems, a user can submit a personal recommendation to one of his contacts. For instance, a presentation of a content item in the internet is often accompanied by a so-called "tell-a-friend" button that a user can click on and thereby submit a link, i.e. a web address, to the representation of the content item and eventually a personal note to one or more of his contacts.

Recommender systems are known that are adapted to promote such personal recommendations or semi-personal recommendations. For instance, a recommender system is known that recommends an item to a user, if one of the contacts of the user has positively rated the item. Such semi-personal recommendation can also be generated, if the contact of the user has only implicitly expressed that he/she likes a content item. For instance, a recommender system of the user recognises that the user likes or dislikes a certain content item and forwards this recognition in the form of a recommendation to all contacts of the user, thereby informing all contacts of the user that the user likes/dislikes a certain content item. The recognition, whether the user likes/dislikes a certain content item can also be based on an explicit rating the user has submitted in relation to this certain content item.

Another possible recommendation mechanism is that a certain content item is recommended to the user, whenever a sufficiently large fraction of contacts of the user has rated the content item sufficiently high. Again, such recommendation of an item to the user can be based on explicit ratings that are given to the content item by the user's contacts, but it can also be based on estimated like-degrees that a recommender system has determined for the contacts of the user.

A user participating in a computer-implemented social network, such as Facebook, MySpace, LinkedIn, Xing and so forth can have a large amount of associated contacts. Thus, the number of automatically generated semi-personal recommendations can quickly increase such that a main advantage of semi-personal recommendations, namely that recommendations exhibiting some personal character are assumed to be trusted more than recommendations solely made by an algorithm, can be rendered mute.

SUMMARY OF THE INVENTION

It is a technical object of the present invention to present technical means for automatically reducing the amount of semi-personal recommendations presented to a user of a computer-implemented social network.

According to a first aspect of the present invention, the above identified technical object is achieved by a method of operating a personal recommender system arranged for being coupled to a computer-implemented social network, which comprises the following steps:
  a) detecting that a recommendation of a contact-genre tuple has been filed in a user account of a user A of the social network, wherein the recommendation of the contact-genre tuple relates to a content item of a specific genre and has been initiated through a contact account of a contact of user A,
  b) monitoring a recommendation related reaction behaviour of user A in response to receiving the recommendation,
  c) repeating steps a) to b) for a plurality of recommendations of the same contact-genre tuple and logging a plurality of monitored reaction behaviours for determining a user A related relevance-taste index associated to the contact-genre tuple in dependence of the plurality of monitored reaction behaviours,
  d) filtering a current recommendation of the same contact-genre tuple by filing the current recommendation in the user account only, if a filtering criterion is fulfilled by the relevance-taste index of the current recommendation and by blocking the current recommendation, if the filtering criterion is not fulfilled.

The method offers the advantage that it can be carried out by a machine as is illustrated in the description of preferred embodiments where an example of how the relevance-taste index can be calculated is given.

The present invention includes the recognition that a contact of user A and user A can have one or more subject areas for which they share interests, however, in most cases, the contact and user A do not have the same opinion on other subject areas and there can furthermore be subject areas, in which they do not share interests. In other words, a pair of friends in a social network may share a similar taste concerning content items of one genre, but they may have dissimilar opinions on content items of another genre. This typically holds true for the appreciation of different genres of video content. For instance, both of a pair of friends may like detective movies; however, only one of the pair may like science fiction movies and the other one may not like science fiction movies. Semi-personal recommendations should only be provided to user A, if both user A and the contact share an interest in the genre of the content item.

Furthermore, if recommendations are automatically generated on behalf of the contact and on the basis of explicit or implicit feedback on a certain content item by the contact, the recommender system should not explicitly ask the contact to which of his/her contacts a semi-personal recommendation should be sent. Considering the large amount of contacts a user of a social network might have (often more than several hundred) such mechanism would be too annoying and too time-consuming for the contact. Also the contact of user A generally does not know what exactly is liked or disliked by all of his contacts.

The present invention provides a solution to the problem of the growing amount of semi-personal recommendations by filing only relevant recommendations in the user account of user A that are sent to user A by or on behalf of his friends/contacts.

By performing steps a) to c), that is to say: by observing explicit or implicit feedback of user A on content items recommended by or on behalf of his/her contacts, it is automatically learned, which of the contacts of user A are relevant for each of the genres in which user A takes an interest.

For each contact-genre tuple, a relevance-taste index is calculated based on the reaction behavior of user A in response to receiving recommendations. For determining the relevance-taste index, a learning algorithm can be applied. For instance, the step of determining the relevance-taste index includes applying a neural network, a Naive Bayes classifier, and/or a support vector machine.

For instance, the determined relevance-taste index can be expressed by a positive or negative number. In an example, the relevance-taste index is expressed by a number part of a value interval $[-1, 1]$ (or any other numerical interval), wherein values close to $-1$ indicate a high relevance but opposite tastes, values close to 0 indicate a low relevance and values close to 1 indicate a high relevance with similar taste. For instance, user A receives a recommendation from contact CU1 relating to a content item of the genre "sports". If user A undertakes nothing in response to receiving such recommendations, the relevance-taste index will be calculated close to 0. If, in another case, user A quickly rates most of the recommended content items negatively, the relevance-taste index concerning the contact CU1 and the genre sports will be calculated close to $-1$. If, in another case, user A quickly rates most of the commended content items positively, the relevance-taste index will be calculated close to $+1$.

The relevance-taste index is used to estimate to what extent a content item of a certain genre will be appreciated by user A, and to filter irrelevant recommendations correspondingly. Only such recommendations are filed with the user account of user A, whose associated relevance-taste index pass the filtering criterion. Other recommendations are initially blocked and not filed in the user account.

By filtering the current recommendation, user A is confronted with fewer recommendations and only with such recommendations that actually have relevance for user A. Therefore, browsing through the internet via the user account is more convenient to user A. Furthermore, the entire network load is reduced, as fewer recommendations are filed into the user account and user A has thus to deal with fewer recommendations. As fewer recommendations are to be administrated, storage space is accordingly reduced. Each user interaction with respect to recommendations is time consuming on the side of the user and energy and resource consuming on the side of the recommender system and/or on the side of the network. If a plurality of personal recommender systems are operated according to the proposed operating method, there will be, globally regarded, a significantly reduced network load and therefore significantly reduced power consumption. Furthermore, management of the entire social network will be facilitated, as a network load is reduced. Also, spread of automatically generated semi-personal recommendations can be significantly reduced.

The personal recommender system to be operated can be a content-based recommender system, a collaborative-filtering-based recommender system, a combined content-based and collaborative-filtering-based recommender system or a recommender system that operates according to another recommending mechanism.

Within the scope of the description of the present invention, the wording "user" refers to a human being having a user account at a computer implemented social network. Such user usually has a plurality of so-called contacts (also referred to as "friends"), wherein these contacts/friends are also users having a user account (also referred to as "contact account") at the same or another computer implemented social network.

In the following, the wording "recommendation" refers to an electronic message that either includes a positive recommendation for a content item, e.g., a suggestion to order the content item, or a negative so-called warning related to a content item, e.g., a comment of a contact of user A indicating that the contact does not like the content item. Such electronic message can be, e.g., an e-mail, a short message service message, an electronic pop-up, and derivatives thereof. A recommendation can include a sender identifier, for instance the name and/or a picture of the contact and an information related to the recommended content item, for instance a link pointing to a website where the recommended content item is presented and/or a description, such as a picture, of the recommended content item. Furthermore, recommendations that are directly submitted from user to another user/contact of the user are referred to as "personal recommendations". Recommendations that are automatically, i.e. without explicit interaction of a sender, sent to a user but that include a hint to a contact of the receiving user are referred to as "semi-personal recommendations".

The computer implemented social network is to be understood to follow its standard definition in the field of information and communication technology. Thus, a computer implemented social network is a computer network that allows participation of a plurality of users, wherein each user can set up a personal list of contacts, wherein each contact of such list is also a participant of the same or another social network.

Initiating a recommendation through a contact account means that the contact associated to the contact account has either explicitly sent a recommendation for a certain content item to one of his contacts, for instance to user A, or, respectively, initiating a recommendation can be performed automatically by a recommender system coupled to the contact account, as explained introductory.

Reactions of user A in response to receiving the recommendation initiated through the contact can be effected, as explained above, directly or indirectly or, in other words, explicitly or implicitly. Monitoring of such reaction is carried out correspondingly. The step of monitoring the reaction behavior can include storing a time delay between filing of the recommendation and a reaction, such as a regarding the recommended content item by following a link presented in the recommendation, and/or storing of a numerical value indicating that the reaction is positive or negative.

For instance, the filtering criterion is expressed as a fixed threshold, wherein the absolute value of the relevance-taste index of the current recommendation must be larger or equal to the fixed threshold in order to be filed in the user account. The filtering criterion can also be expressed by a threshold that is dynamically adjusted in dependence of the monitored reaction of user A in response to receiving recommendations. For instance, the filtering criterion is defined such that for each genre g at least the recommendations of k contacts are not filtered out, wherein k is a suitably chosen integer value. The filtering criterion can also be calculated such that k is dependent of the genre g. In that case, user A may have more contacts from which recommendations are passed for one genre than for another genre.

The filtering criterion is, for instance, fulfilled by the relevance-taste index of the current recommendation, if the absolute value of the relevance-taste index of the current recommendation is larger than the fixed or dynamically adjusted threshold value.

Filing the current recommendation in the user account means that user A has the possibility to perceive the current recommendation in a usual manner. Blocking the current recommendation means that user A will initially not be confronted with the blocked current recommendation.

In a preferred embodiment of the operating method, current recommendations that have been sent to the user account but have been blocked and therefore have not been provided to user A are buffered and at least one of the buffered recommendations is filed in the user account, if the at least one recommendation fulfils an adjusted filtering criterion. This embodiment has the advantage that first recommendation arriving at the user account might be blocked, as the current filtering criterion is not fulfilled. However, as the filtering criterion can be dynamically adjusted, blocked recommendations could, at a later point of time, fulfil the adjusted filtering criterion. If so, the buffered recommendation that has been initially blocked is now filed in the user account, such that user A can perceive the recommendation. In any case, initially blocked recommendations do not get lost but are buffered for a certain amount of time and can thus be used for further purposes later on.

In another embodiment, the method comprises the additional steps of
grouping blocked recommendations being related to a common content item y,
determining an accumulated relevance-taste index by summing relevance-taste indices associated to each of the grouped recommendations,
filing the grouped recommendations as a single combined recommendation in the user account, if the accumulated relevance-taste index fulfils the filtering criterion.

In this embodiment, first recommendations for a given content item that are sent to user A may be blocked, but the relevance-taste indices of the incoming recommendations are stored together with corresponding information regarding the contacts, the content item y and the content items' genre, such that at some point in time, the group recommendations can collectively fulfil the filtering criterion, for instance by exceeding a threshold.

In another preferred embodiment, the method additionally comprises the steps of:
identifying senders F(A) of the grouped recommendations, wherein each of the senders F(A) has an associated contact account that is linked to the user account of user A,
for each of the identified senders F(A), determining a like-degree $\lambda(B,y)$ for the common content item y, the like-degree $\lambda(B,y)$ indicating the respective sender's B interest or disinterest in the common content item y,
calculating a normalized accumulated relevance-taste index in dependence of the determined like-degrees and the accumulated relevance-taste index, wherein the normalized accumulated relevance-taste index corresponds to an assumed like-degree $\lambda(A,y)$ indicating user A's interest or disinterest in the common content item y and
filing a recommendation for the common content item y in the user account, if the normalized accumulated relevance-taste index fulfils the filtering criterion.

This embodiment has the advantage that only such recommendations are filed in the user account of user A, in which user A is likely to have a positive interest in. This embodiment includes the recognition that a reduction of the spread of semi-personal recommendations that have been generated due to recommender systems being based on a collaborative-filtering can be achieved by weighting the like-degree that is usually determined within collaborative-filtering mechanisms with determined relevance-taste indices. For instance, the normalized accumulated relevance-taste is calculated according to the formula $$\lambda(A,y) = \Sigma_{B \in F(A)} r(B,g(y)) \cdot \lambda(B,y) / \Sigma_{B \in F(A)} |r(B,g(y))|,$$

wherein $\Sigma_{B \in F(A)} r(B, g(y))$ is the accumulated relevance-taste index.

Thus, a high like-degree of a contact with respect to the common content item only promotes a filing of the recommendation for the common content item into the user account of user A, if there is additionally a high relevance-taste index associated to the contact and the genre of the common content item.

In order to allow user A to differentiate between filtered and unfiltered recommendations, the method comprises, in a preferred embodiment, the step of
presenting filtered recommendations to user A through a display of a user interface coupled to the personal recommender system by employing a colour encoding for encoding a respective assumed like-degree of each of the presented recommendations.

In an embodiment, a colour overlay is used for displaying the filtered recommendations in order to indicate the respective assumed like-degree $\lambda$ (A, x), wherein a degree of colour saturation used to overlay a given content item as a function of $\lambda$ (A, x). In this way, user A needs not be confronted with recommendations from individual contacts/friends, but with subtle colour overlays that indicate the collective recommendation of a subset of friends. For instance, when a number of friends like a common item and have sent recommendations to user A correspondingly and when this number of friends exceeds a predetermined number, such as 5, 10 or 15, such item is highlighted in the user interface of user A by using a colour overlay.

Alternatively or additionally, recommendations based on single friends are highlighted by a colour overlay, if they score well enough. In an embodiment, these recommendations are complemented with small images of the friend that initiated the recommendation. In another embodiment, the colour overlay is only expressed, if the like-degree of a sufficiently large subset of a selected community is known and/or if the selected community is large enough. Thereby, privacy issues can be respected. In addition, user A may set a threshold on the minimum like-degree of a community before it becomes visible in the overlay, such that only clear preferences of a community become expressed.

In a preferred embodiment of the method, the step of determining the relevance taste index includes applying a learning algorithm, such as applying a neural network, a Naive Bayes classifier, or a support vector machine.

It is furthermore preferred that the step of applying of the learning algorithm includes taking into account a warning related to content item, which has been submitted to the contact account, wherein the warning indicates a contact dislike with respect to the contact item. A warning can be, for instance, a message from a contact to user A indicating that the contact particularly dislikes a certain content item. This can also be used in the learning algorithm in order to establish similarity or dissimilarity in taste between user A and the contact for a certain genre. For instance, it can be found out with the learning algorithm that items of a certain genre are disliked by the contact are often appreciated by user A, that is to say: it may be established that, for a given genre, user A and the contact have opposite tastes. In such case, the method can include converting a warning submitted by the contact to user A and related to a certain content item into a recommendation relating to the same content item and filing the converted warning in the user account. In these cases, the contact-genre tuple can still have a high relevance for making recommendations to user A.

In addition, further aspects may influence the filtering step, that is to say: the decision, whether to actually file a current recommendation in the user account of user A. For instance, in a further embodiment of the operating method, if user A has recently watched a video, a recommendation relating to this already consumed content item will be blocked. Such blocked recommendation can be, as already has been explained, buffered or deleted.

The method of the first aspect of the present application is particular suited for being implemented within a personal recommender system. Furthermore, the operating method can be applied in the context of computer-implemented social networks consisting of personal computers, set-top boxes etc. The operating method of the first aspect of the present invention furthermore increases the usability and user satisfaction of recommender systems. Furthermore, the operating method can be integrated into the personal channel concept. Such concept shall briefly be explained:

A personal channel of an individual can be stored in a memory and contains personal data that provide information about linear and/or non-linear content items which the individual likes or dislikes. For instance, a group of certain television (TV) programs are bundled into a personal channel. Instead of zapping through all available broadcast programs/channels, the individual can zap through his personal channels. For instance, the individual has set up a personal news channel, a personal cartoon channel and/or a personal movie channel. Due to the fact that the amount of available content items continues to increase, such a personal channel becomes an increasingly important tool, as it offers the possibility to quickly find a content item of interest. A personal channel can have a specification, for instance in terms of a number of manually added "seed" content items or of a Boolean expression consisting of a number of disjuncts, which can define what content items may be automatically added to the personal channel. A personal channel further can have a set of received or (to be) recorded content items that are received/recorded according to the "seed" content items or, respectively, according to the Boolean expression. The user can zap through the received/recorded content items, wherein a recorded item is usually stored on a hard disk operatively connected to the personal channel. In particular, the concept of personal channels allows one or more users of a recorder, e.g. employing hard-disk technology, to independently define a plurality of channels, which are similar to existing broadcast channels, but which are typically filled with recorded broadcast content, downloaded internet content, or links to downloadable or streamable internet content.

Such a personal channel is personalized, not only due to the fact that the individual/user creates his own personal channel, but also by the fact that such a personal channel may be equipped with a recommender system, in particular with a recommender system that is operated according to the present invention. Such recommender system can learn the taste of the user of the channel by user feedback, either explicitly or implicitly, as described, and can serve to fine-tune the content of the channel.

Creating a personal channel is, for instance, done by a user by simply choosing a program from the electronic program guide (EPG) and indicating that he/she wants to create a new personal channel with this program. This initial program serves as a seed, and more, similar programs will be selected and/or recommended according to the proposed operating method for adding to the personal channel. There are, thus, several possibilities of how a personal channel can grow: The user may add a new content item manually, the user may add a new content item upon recommendation of a recommender system, or a personal channel manager automatically adds a new content item to the personal channel that is in some way similar to content items already existent in the personal channel, e.g., which matches to the manually added content items. As the relevancy of recommendations provided by a recommender system that is operated according to the proposed operating method is strongly increased, the personalization of the personal channel can, thereby, also be increased, either due to automatic adding of recommended content items or due to manually added content items upon reception of corresponding recommendations.

Instead of recommendations between users of a social network, the operating method can, according to the aforesaid, also be used in the context of recommendations between personal channels of users in a social network. For instance, the personal channels are typically restricted to a few genres and the relevance can be defined within the context of these few genres.

According to a second aspect of the present invention, the above identified technical object is achieved by a computer program for operating a recommender system, which comprises program code means for causing the recommender system to carry out the steps the method of the first aspect of the present invention, when the computer program is run on a computer controlling the recommender system.

According to a third aspect of the present invention, the above identified technical object is achieved by a filter apparatus arranged for being coupled to a recommender system for a user A of a computer implemented social network, which comprises the following components:

- a detector configured to detect that a recommendation of a contact-genre tuple has been filed in a user account of user A of the social network, wherein the recommendation of the contact-genre tuple relates to a content item x of a specific genre and has been initiated through a contact account of a contact CU1 of user A,
- a monitoring unit configured to monitor a recommendation related reaction behavior of user A in response to receiving the recommendation,
- a data logger configured to log a plurality of monitored reaction behaviours being related to a plurality of recommendations of the same contact-genre tuple,
- an analyser configured determine a user A related relevance-taste index associated to the contact-genre tuple in dependence of the plurality of monitored reaction behaviours,
- a recommendation filter configured to filter a current recommendation of the same contact-genre tuple by filing the current recommendation in the user account only, if a filtering criterion is fulfilled by the relevance-taste index of the current recommendation and by blocking the current recommendation, if the filtering criterion is not fulfilled.

Principally, the filtering apparatus of the third aspect of the present invention shares the advantages of the operating method of the first aspect of the present invention. In particular, the filtering apparatus has preferred embodiments that correspond to the additional steps of the preferred embodiments of the operating method described above.

According to a fourth aspect of the present invention, the above identified technical object is achieved by a recommender system that comprises a filtering apparatus according to the third aspect of the invention.

In a preferred embodiment, the recommender system additionally comprises a user interface for presenting a filtered recommendation to user A. The filter recommendations can be encoded with a color overlay in order to allow for user A to differentiate between filtered recommendations and non-filtered recommendations. In another preferred embodiment, the recommender system additionally comprises a personal recommender engine coupled to the user interface and configured to provide an engine based recommendation. In a preferred embodiment, the user interface part of the architecture integrates the recommendations made by contacts/friends and the recommendations that a personal recommender engine makes for user A.

The personal recommender engine can be a content based recommender engine or a collaborative-filtering-based recommender engine or a combination thereof or a recommender engine that follows another operating approach.

The user interface can be a TV screen, a monitor of a computer, a display of a mobile device, or any other suitable interface for presenting recommendations to user A.

In a particularly preferred embodiment the recommender system additionally comprises a memory configured to store blocked recommendations. Such blocked recommendations can be presented to user A at a later point of time, for instance or grouping some blocked recommendations and determining an accumulated relevance-taste index.

All aspects of the invention can be applied in the context of a personal channel concept. For instance, if a person or household uses multiple personal channels to interact with a TV recommender, an aspect of the invention described above could be embedded in the context of personal channels. Hence, relevance between personal channels of persons in a social network can be used to make effective recommendations from a personal channel of a contact of user A to a personal channel of user A.

All aspects of the invention can furthermore be applied in the context of a social network consisting of PCs, set-top boxes, et cetera. On such devices recommender technology can be installed. An application of an aspect of the invention increases the usability and user satisfaction of such recommenders. More specifically, they can be integrated into the personal channel concept that is believed to offer the ease-of-use that users are used to. Instead of recommendations between friends in a social network, aspects of the invention can also be used in the context of recommendations between personal channels of friends in a social network. In that case, the personal channels are typically restricted to a few genres, and the relevance can be defined within the context of these few genres.

It shall be understood that the operating method of the first aspect of the invention, the computer program of the second aspect of the invention, the filtering apparatus of the third aspect of the invention and the recommender system of the fourth aspect of the invention have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DESCRIPTION OF EMBODIMENTS

Figure 1:
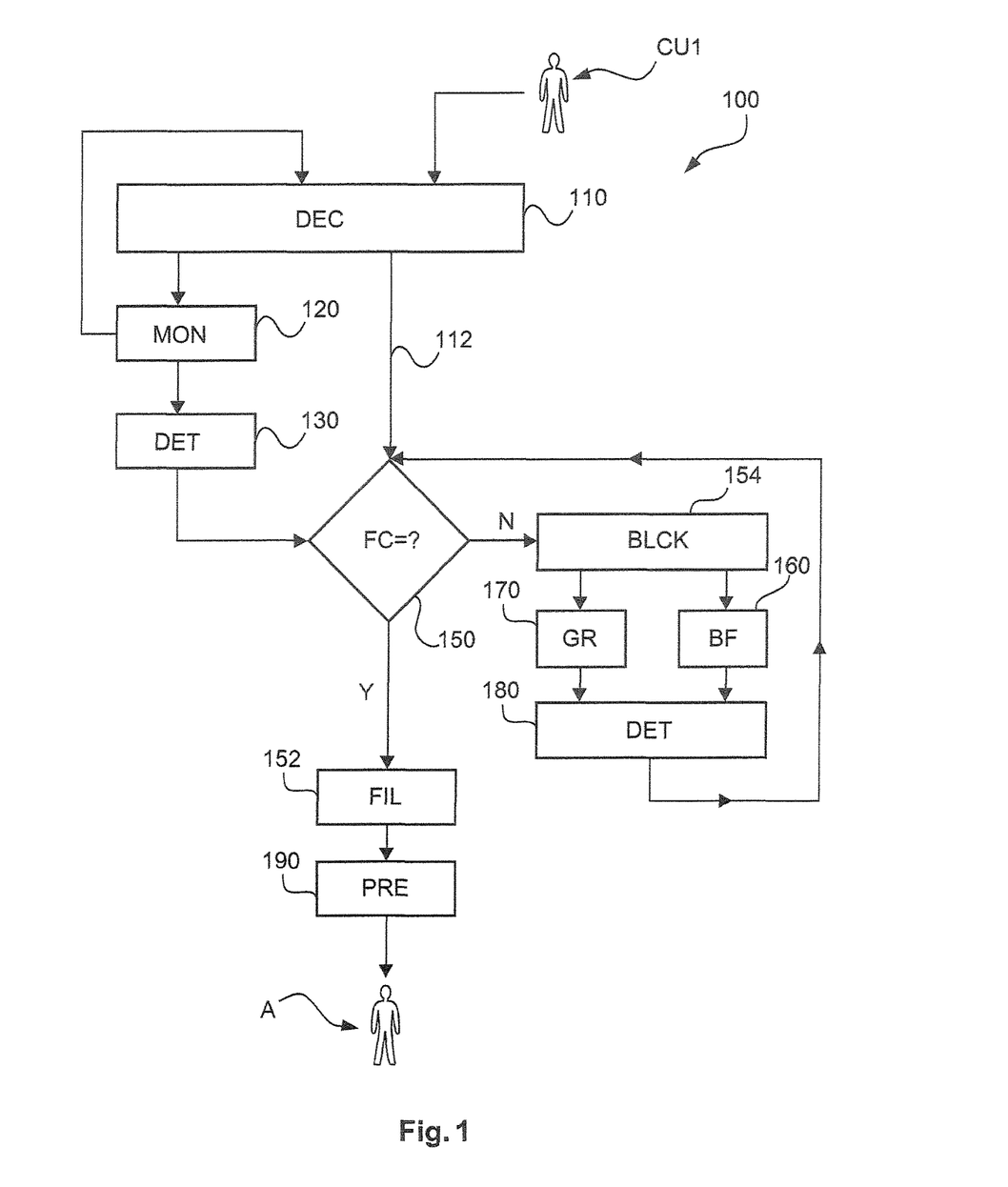
FIG. 1 shows a flowchart illustrating an embodiment of an operating method of operating a personal recommender system in accordance with the first aspect of the invention.

FIG. 1 shows a flowchart illustrating an operating method 100 of operating personal recommender system that is arranged for being coupled to a computer implemented social network. The method 100 serves the purpose of reducing the amount of the irrelevant recommendations being presented to user A and originating from one or more contacts of user A. User A participates in the social network and has one or more contacts which also participate as users in the social network. Reducing the amount of recommendations that are provided to user A is in particular achieved by a filtering step 150, in which it is checked, whether or not a current recommendation fulfils a certain filtering criterion. Only if the filtering criterion is fulfilled, the current recommendation will be presented to user A.

In a first step 110, it is detected that a recommendation of a contact-genre tuple (CU1, g) has been filed in the user account of user A of the social network. The recommendation of the contact-genre tuple (CU1, g) relates to a content item x of a specific genre (g=g (x)) and has been initiated through a contact account of a contact CU1 of user A. In a next step 120, it is monitored how user A reacts in response to receiving the recommendation initiated by contact CU1. Such reaction may occur directly or indirectly or, respectively, implicitly or explicitly. For instance, it is possible that user A rates the recommended content item x and that this rating is monitored in step 120. It is also possible, that user A consumes the content item x, for instance, if content item x is a video. Also, such reaction behaviour can be monitored. If, in another example, user A undertakes no action, also such non-action is monitored in step 120. User A could furthermore order the content item x, if the content item x is available online.

The detecting step 110 and the monitoring step 120 are repeated for a plurality of recommendations of the same contact-genre tuple and a plurality of monitored reaction behaviours are logged for determining a user A related relevance-taste index r=r((CU1, g)) associated to the contact-genre tuple (CU1, g) in dependence of the plurality of monitored reaction behaviours in step 130. Such repeating results in a learning process, wherein accurate relevance-taste indices for a plurality of contact-genre tuples can be determined. Such learning process can include applying a new network, a Naive Bayes classifier and/or a support vector machine.

The relevance-taste index indicates both the relevance of recommendations of the specific contact-genre tuple and an assumed taste of user A relating to the genre of the content item x. For instance, the relevance-taste index r is a number between −1 and +1 (or any other numerical domain). The relevance-taste index r can be determined, such that a negative value indicates a high relevance and a dislike of user A in the genre. For instance, the relevance-taste index r is determined to be close to −1, if user A reacts quickly in response to receiving such recommendations and expresses a dislike with respect to content item x, for instance by negatively rating content item x. The relevance-taste index r is determined close to 0, if, for example, user A does not react at all in response to receiving such recommendations. If user A reacts positively in response to receiving such recommendations, for instance by entirely watching a recommended video, or by positively rating the content item x or by ordering the content item x, the relevance-taste index r is determined close to +1.

According to a preferred embodiment, the relevance-taste index can be determined as follows:

First let us consider contact-genre tuples arriving at user A of a social network (see claim 1, step a). These tuples are stored in a data structure resembling the following table where $(u_i, g_i)$ represents the tuple received from user $u_i$ having content genre $g_i$. We will also consider (without lack of generality) n different genres: $g_1, \ldots g_n$.

| Tuples contact-genre | Count of positive reactions | Count of negative reactions |
|---|---|---|
| $u_1, g_1$ | $N((u_1, g_1), +)$ | $N((u_1, g_1), -)$ |
| $u_1, g_2$ | $N((u_1, g_2), +)$ | $N((u_1, g_2), -)$ |
| ... | ... | ... |
| $u_1, g_n$ | $N((u_1, g_n), +)$ | $N((u_1, g_n), -)$ |
| $u_2, g_1$ | $N((u_2, g_1), +)$ | $N((u_2, g_1), -)$ |
| $u_2, g_2$ | $N((u_2, g_2), +)$ | $N((u_2, g_2), -)$ |
| ... | ... | ... |
| $u_2, g_n$ | $N((u_2, g_n), +)$ | $N((u_2, g_n), -)$ |
| ... | ... | ... |
| ... | ... | ... |
| $u_i, g_1$ | $N((u_i, g_1), +)$ | $N((u_i, g_1), -)$ |
| $u_i, g_2$ | $N((u_i, g_2), +)$ | $N((u_i, g_2), -)$ |
| ... | ... | ... |
| $u_i, g_n$ | $N((u_i, g_n), +)$ | $N((u_i, g_n), -)$ |

Every recommendation received by user A has an associated tuple depending on the user sending it and the genre of the content. For every recommendation, the reaction of A is monitored (according to step b in claim 1). If the reaction is positive (e.g. A watches the recommended item) then, the count for positive reactions corresponding to the tuple of the recommendation is increased by one (second column of the previous table). If the reaction is negative, the count for negative reactions is increased by one (third column of the previous table). In addition to the table above, two additional counts are maintained: N(+) and N(−) which are, respectively, the sum of all positive and all negative reactions for all recommendations received for which a reaction was monitored (the sum of all values of the columns 2 and 3 of the previous table).

Given a new recommendation $(u_x, g_y)$ by contact $u_x$ for content of genre $g_y$, the relevance-taste index $r((u_x, g_y))$ is calculated as follows (refer to step c in claim 1).

First we calculate:

$$Pr(+ | (u_x, g_y)) = \frac{N((u_x, g_y), +)}{N(+)}$$

and $$Pr(- | (u_x, g_y)) = \frac{N((u_x, g_y), -)}{N(-)}$$

In case $N((u_x, g_y), +)$ or $N((u_x, g_y), -)$ are 0, we replace them with small arbitrary values (Laplace correction).

Then calculate the skewing factor $s((u_x, g_y))$ (ranging from 0 to ∞) is calculated as follows:

$$s((u_x, g_y)) = \frac{Pr(+ | (u_x, g_y))}{Pr(- | (u_x, g_y))}$$

Finally, the relevance-taste index r((ux, gy)) is given by:

$$r((u_x, g_y)) = \frac{s((u_x, g_y))}{1 + s((u_x, g_y))}$$

The relevance-taste index ranges from 0 to 1.

Depending on the value of the relevance-taste index, the recommendation with tuple $(u_x, g_y)$ will be blocked (value smaller than a pre-defined threshold) or delivered to user A (value higher than a pre-defined threshold) (according to the filter criterion FC in step d of the method of claim 1).

Preferably, the recommendations that have been blocked are buffered and their relevance-taste indexes are accumulated until their sum exceeds a threshold. When this happens, one joint group recommendation is sent to A.

The filtering criterion FC can be, for instance, expressed by a fixed threshold, thus for instance a value of 0.5. To give an example: if the relevance-taste index r is a value between −1 and +1, the filtering criterion can be formulated as:

FC: $(r<-0.5)v(r>0.5)$

In that case, only such a further recommendation will pass the filtering step 150, if the current recommendation 112 has a correspondingly high or low relevance-taste index. In other words: in step 150, a current recommendation 112 is only filed (step 152) in the user account of user A, if the filtering criterion is fulfilled by the relevance-taste index of the current recommendation and blocked (step 154) the current recommendation, if the filtering criterion is not fulfilled.

After a filtered recommendation has been filed (step 152) in the user account of user A, it can be presented to user A (step 190).

Blocked recommendations can optionally be buffered (step 160) and it can be determined in step 180 at a later point of time, whether or not a buffered recommendation then fulfils the filtering criterion. For instance, the filtering criterion can change over time and a buffered recommendation, at the point of arrival, not is sufficiently high or, respectively, is sufficiently low relevance-taste index.

Initially blocked recommendations that relate to a common content item can be grouped in step 170. For these grouped recommendations, an accumulated relevance-taste index is determined in step 180 by summing relevance-taste indices associated to each of the grouped recommendations. For instance, it is possible that some of the contacts of user A rate a same content item positively. If these contacts are equipped with a recommender engine that automatically generates recommendations to contacts of these contact (that is to say, for instance to user A), a recommendation for this common content item will be sent to user A from each of his/her contacts. The relevance-taste index of a single recommendation might not be sufficiently high or sufficiently low enough, to pass the filtering step. Therefore, such recommendations are blocked in step 154. If the determined accumulated relevance-taste index fulfils the filtering criterion in step 150, the grouped recommendations are filed as a single combined recommendation in the user account of user A in step 152. Therefore, instead of being confronted with a plurality of recommendations that user A could classify as irrelevant, user A will be confronted with a combined recommendation that user A probably will classify as relevant.

In the outcome, the method 100 includes an automatic learning, which contacts of user A are relevant for each of the genre, into which user A takes an interest. By observing over time the feedback of user A, which can be explicit or implicit feedback, in response to receive recommendations concerning items from a certain contact, for instance contact CU1, it is learned, for which genres recommendations initiated by contact CU1 are indeed appreciated by user A. In this way, it can be learned that recommendations from contact CU1 related, e.g., to the genre "science fiction" are generally appreciated by user A, but the recommendations of contact CU1 related, e.g., to "detectives" are usually not appreciated by user A. This non-appreciation of user A does not necessarily imply that user A does not like consuming the recommended content items, for instance does not like watching detective films, it only implies that user A does not like the ones recommended by contact CU1. In particular, within the monitoring step 120 and the determining step 130, a learning algorithm can be used to interpret feedback from user A on recommendations by others. In this way, for each contact genre tuple (CU1, g), (CU2, g) . . . , the respective relevance-taste index is determined in order to only file recommendations of such contact-genre tuples that are relevant for making meaningful recommendations to user A.

A recommendation initiated by contact CU1 can also express a dislike of contact CU1 with regard to the content item. In such case, the "recommendation" is called a "warning". A warning is, thus, a message initiated by contact CU1 and sent to user A, indicating that contact CU1 particularly dislikes a content item. Such a warning can also be used in the learning algorithm, that is to say: within steps 110, 120 and 130, in order to establish similarity or dissimilarity in taste between contact CU1 and user B for a certain genre. It can be found out that items of a certain genre that are disliked by contact CU1 are often appreciated by user A; that contact CU1 and user A have "opposite tastes". In that case, a warning sent from contact CU1 for a certain content item may effectively be a recommendation for the certain content item submitted to user A. If the relevance-taste index values can assume values as elaborated above, the relevant taste index will assume a value close to −1 in case of such "opposite tastes".

Figure 2:
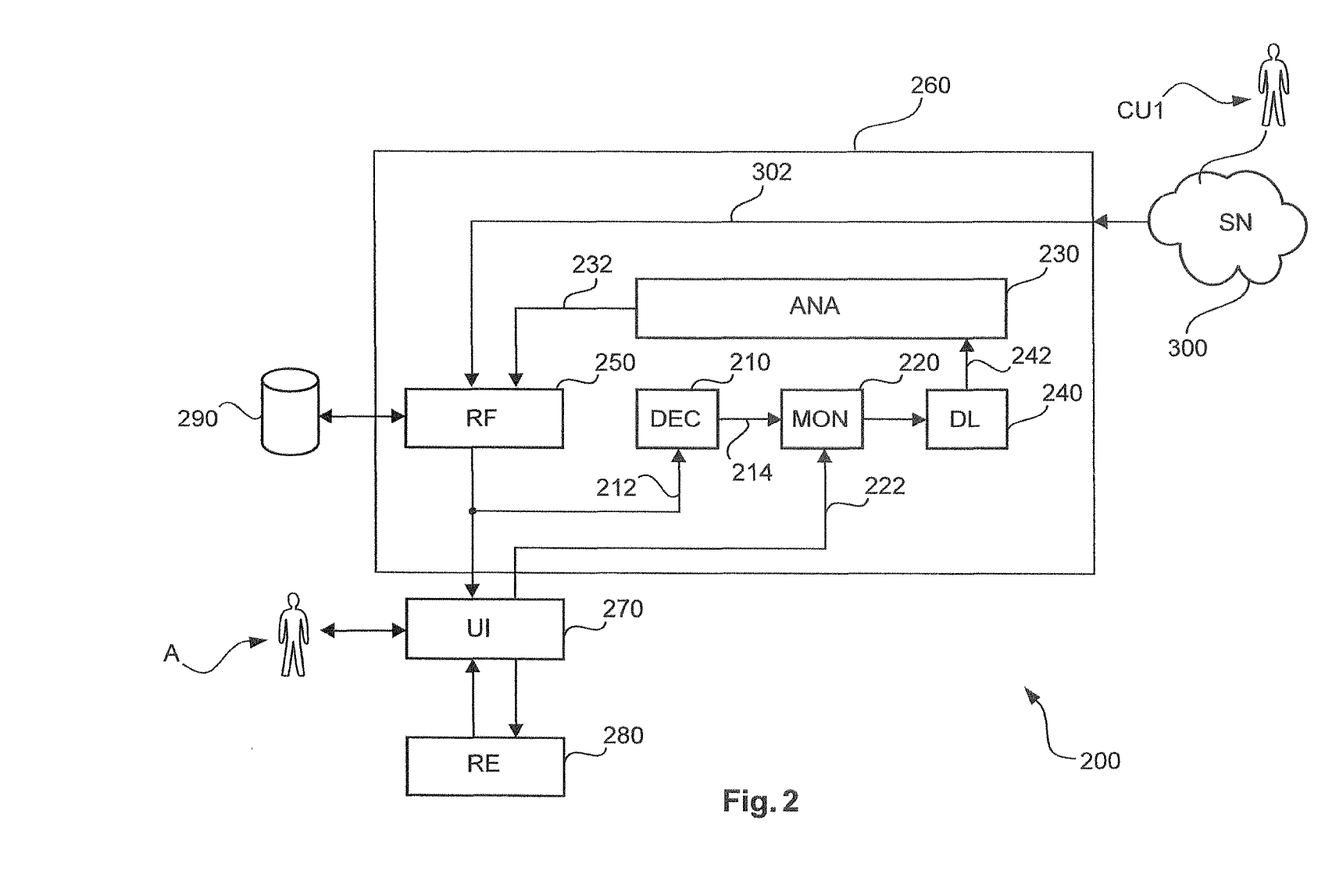
FIG. 2 shows a schematic block diagram that exemplary illustrates an embodiment of a filtering apparatus embedded in a recommender system in accordance with the fourth aspect of the invention.

The operating method 100 is especially suited for being implemented within a personal recommender system, for instance a personal recommender system as depicted in FIG. 2.

FIG. 2 shows a block diagram of a recommender system 200 in accordance with the fourth aspect of the invention.

User A is a member of the social network 300 and has a plurality of contacts, which are also members of the social network 300. The recommender system 200 comprises a filter apparatus 260 for filtering recommendations initiated by contacts of user A. Filtered recommendations can be presented to user A through a user interface 270 that is coupled to the filter apparatus 260. Furthermore, a recommender engine 280 can be coupled to the user interface 270, such that regular recommender engine based recommendations can also be presented to user A.

The filter apparatus 260 comprises a detector 210 coupled to the user interface 270 that detects that a recommendation 212 of a contact-genre tuple (CU1, g) has been filed in a user account of user A. The recommendation 212 of the contact-genre tuple (CU1, g) relates to content item x of a specific genre g=g (x) and has been initiated through a contact account of a contact CU1 of user A. The monitoring unit 220 is coupled to the detector 210 and monitors a recommendation related reaction behaviour 222 of user A in response to receiving the recommendation 212. For instance, the monitoring unit 220 comprises a timer that determines a time delay between filing of the recommendation 212 and a reaction of user A.

The filter apparatus 260 furthermore comprises a data logger 240 that logs a plurality of monitored reaction behaviours being related to a plurality of recommendations of the same contact-genre tuple (CU1, g). For logging, the data logger 240 can comprise storage means for storing monitored recommendation related reaction behaviour 214, e.g., in the form of numerical values that indicate a likedegree of user A with respect to the recommended content item. Such numerical values can be stored associated to a respective time delay, wherein such time delay can be indicative of the relevance of a recommendation type, e.g., indicative for the recommendations of the tuple (CU1,g).

The logged data 242 representing the reaction behaviour is analysed by an analyser 230 coupled to the data logger 240. The analyser 230 determines a user A related relevance-taste index r=r((CU1,g)) associated to the contact-genre tuple in dependence of the plurality of monitored reaction behaviours 242. The analyser 230 can implement a learning algorithm in order to determine an appropriate relevance-taste index.

The filter apparatus 260 of the recommender system 200 comprises a recommendation filter 250 that is coupled to the analyser 230 and receives the determined relevance taste index for one or more contact-genre tuples.

The recommendation filter 250 filters a current recommendation 302 by filing the current recommendation 302 in the user account of user A only, if the filtering criterion is fulfilled by the relevance-taste index of the current recommendation and by blocking the current recommendation, if the filtering criterion is not fulfilled. Blocked recommendations can be stored in a memory 290 of the recommender system 200 for eventually presenting them to user A at a later point of time. Such stored or, respectively, buffered recommendations can be combined with other recommendations for the same content item that are later made by other contacts of user A.

It shall be understood that an arrangement of elements of a respective figure predominately serves a purpose of an evident description; it does not relate to any actual geometric arrangement of parts of a manufactured apparatus/device according to the invention.

In the claims, the word "comprising" does not exclude other elements or steps, and the indefinite article "a" or "an" does not exclude a plurality.

A single unit or device may fulfil the functions of several items recited in the claims. The mere fact that certain measures are recited in mutually different dependent claims does not indicate that a combination of these measures cannot be used to advantage. Any reference signs in the claims should not be construed as limiting the scope.

The computer program of the second aspect of the invention may be stored/distributed on a suitable medium, such as an optical storage medium or a solid-state medium supplied together with or as part of other hardware, but may also be distributed in other forms, such as via the Internet or other wired or wireless telecommunication systems.

The present invention relates to an operating method of operating a recommender system, a filtering apparatus for a recommender system, a recommender system and a corresponding computer program.

An idea of the invention is to automatically learn for a user A in a social network, which recommendations of contacts of user A, who are also members of the social network, are relevant with respect to a genre into which user A is interested in. A learning algorithm is used to interpret feedback from user A in response to receiving recommendations from his/her contacts. Thereby, for each combination of a contact and a genre, a relevance-taste index can be determined. The determined relevance-taste index is subjected to a filter. Only such recommendations are provided to user A, whose associated relevance-taste indices fulfil a filtering criterion. Thereby, the amount of irrelevant recommendations submitted to user A can be significantly reduced.

What is claimed is:

1. A method of operating a personal recommender system arranged for being coupled to a computer implemented social network, the computer implemented social network being a computer network that allows participation of a plurality of users, wherein each user can set up a personal list of contacts, wherein each contact of such list is also a participant of the same or another social network, wherein the method is carried out automatically by a machine and comprises the steps of:
   a) detecting that a recommendation of a contact-genre tuple (CU1,g) has been filed in a user account of a user A of the social network, wherein the recommendation of the contact-genre tuple (CU1,g) relates to a content item x of a specific genre (g=g(x)) and has been initiated through a contact account of a contact CU1 of user A,
   b) monitoring a recommendation related reaction behaviour of user A in response to receiving the recommendation filed in the user account,
   c) repeating steps a) to b) for a plurality of recommendations of the same contact-genre tuple (CU1,g) and logging a plurality of monitored reaction behaviours for determining a user A related relevance-taste index r=r((CU1,g)) associated to the contact-genre tuple (CU1, g) in dependence of the plurality of monitored reaction behaviours, and
   d) filtering a current recommendation of the same contact-genre tuple (CU1,g) sent to the user A by filing the current recommendation in the user account only when a filtering criterion is fulfilled by the relevance-taste index of the current recommendation and blocking the current recommendation when the filtering criterion is not fulfilled by the relevance-taste index, presenting filtered recommendations to user A through a display of a user interface coupled to the personal recommender system and storing blocked recommendations in a memory comprised by the recommender system,
   wherein the method further comprises:
      buffering current recommendations that have been sent to the user account but have been blocked and therefore not been provided to user A,
      filing at least one of the buffered recommendations in the user account, if the at least one recommendation fulfils an adjusted filtering criterion,
      grouping blocked recommendations being related to a common content item y,
      determining an accumulated relevance-taste index by summing relevance-taste indices associated to each of the grouped blocked recommendations,
      filing the grouped blocked recommendations as a single combined recommendation in the user account, if the accumulated relevance-taste index fulfils the filtering criterion,
      identifying senders F(A) of the grouped blocked recommendations, wherein each of the senders F(A) has an associated contact account that is linked to the user account of user A,
      for each of the identified senders F(A), determining a like-degree $\lambda$ (B,y) for the common content item y, the like-degree $\lambda$ (B,y) indicating the respective sender's B interest or disinterest in the common content item y,
      calculating a normalized accumulated relevance-taste index in dependence of the determined like-degrees and the accumulated relevance-taste index, wherein the normalized accumulated relevance-taste index corresponds to an assumed like-degree $\lambda$ (A,y) indicating user A's interest or disinterest in the common content item y, and filing a recommendation for the common content item y in the user account, if the normalized accumulated relevance-taste index fulfils the filtering criterion.

2. The method of claim 1, wherein the normalized accumulated relevance-taste index λ (A, y) is calculated according to the formula $$\lambda(A,y) = \Sigma B \in F(A) r(B, g(y)) \cdot \lambda(B, y) / \Sigma B \in F(A) |r(B, g(y))|,$$

wherein ΣB∈F(A)r(B, g(y)) is the accumulated relevance-taste index.

3. The method of claim 2, additionally comprising the step of:
presenting filtered recommendations to user A through a display of a user interface coupled to the personal recommender system by employing a colour encoding for encoding a respective assumed like-degree of each of the presented recommendations.

4. The method of claim 1, wherein the step of determining the relevance-taste index includes applying a learning algorithm, such as applying a neural network, a Naive Bayes classifier, or a support vector machine.

5. The method of claim 4, wherein applying the learning algorithm includes taking into account a warning relating to a content item, which has been submitted through the contact account, the warning indicating a contact's dislike with respect to the content item.

6. The method of claim 1, comprising the additional steps of:
grouping blocked recommendations being related to a common content item y,
determining an accumulated relevance-taste index by summing relevance-taste indices associated to each of the grouped, blocked recommendations, and
filing the grouped, blocked recommendations as a single combined recommendation in the user account, if the accumulated relevance-taste index fulfils the filtering criterion.

7. The method of claim 1, further comprising the step of:
e) generating a colour overlay for displaying the filtered recommendations in order to indicate a respective assumed like-degree λ (A, x), wherein a degree of colour saturation used to overlay a given content item is a function of λ (A, x).

8. A non-transitory storage medium storing a computer program for operating a recommender system, the computer program comprising program code means for causing the recommender system to carry out the steps of claim 1, when the computer program is run on a computer controlling the recommender system.

9. A method of operating a personal recommender system arranged for being coupled to a computer implemented social network, the computer implemented social network being a computer network that allows participation of a plurality of users, wherein each user can set up a personal list of contacts, wherein each contact of such list is also a participant of the same or another social network, wherein the method is carried out automatically by a machine and comprises the steps of:
a) detecting that a recommendation of a contact-genre tuple (CU1,g) has been filed in a user account of a user A of the social network, wherein the recommendation of the contact-genre tuple (CU1,g) relates to a content item x of a specific genre (g=g(x)) and has been initiated through a contact account of a contact CU1 of user A,
b) monitoring a recommendation related reaction behaviour of user A in response to receiving the recommendation filed in the user account,
c) repeating steps a) to b) for a plurality of recommendations of the same contact-genre tuple (CU1,g) and logging a plurality of monitored reaction behaviours for determining a user A related relevance-taste index r=r((CU1,g)) associated to the contact-genre tuple (CU1, g) in dependence of the plurality of monitored reaction behaviours, and
d) filtering a current recommendation of the same contact-genre tuple (CU1,g) sent to the user A by filing the current recommendation in the user account only when a filtering criterion is fulfilled by the relevance-taste index of the current recommendation and by blocking the current recommendation when the filtering criterion is not fulfilled, presenting filtered recommendations to user A through a display of a user interface coupled to the personal recommender system and storing blocked recommendations in a memory comprised by the recommender system;
e) grouping blocked recommendations being related to a common content item y,
f) determining an accumulated relevance-taste index by summing relevance-taste indices associated to each of the grouped blocked recommendations,
g) filing the grouped blocked recommendations as a single combined recommendation in the user account, if the accumulated relevance-taste index fulfils the filtering criterion,
h) identifying senders F(A) of the grouped blocked recommendations, wherein each of the senders F(A) has an associated contact account that is linked to the user account of user A,
i) for each of the identified senders F(A), determining a like-degree λ (B,y) for the common content item y, the like-degree λ (B,y) indicating the respective sender's B interest or disinterest in the common content item y,
j) calculating a normalized accumulated relevance-taste index in dependence of the determined like-degrees and the accumulated relevance-taste index, wherein the normalized accumulated relevance-taste index corresponds to an assumed like-degree λ (A,y) indicating user A's interest or disinterest in the common content item y, and
k) filing a recommendation for the common content item y in the user account, if the normalized accumulated relevance-taste index fulfils the filtering criterion.

10. The method of claim 9, wherein the normalized accumulated relevance-taste index λ (A, y) is calculated according to the formula $$\lambda(A,y) = \Sigma B \in F(A) r(B, g(y)) \cdot \lambda(B, y) / \Sigma B \in F(A) |r(B, g(y))|,$$

wherein ΣB∈F(A)r(B,g(y)) is the accumulated relevance-taste index.

11. The method of claim 10, further comprising:
presenting filtered recommendations to user A through a display of a user interface coupled to the personal recommender system by employing a colour encoding for encoding a respective assumed like-degree of each of the presented recommendations.

12. The method of claim 9, further comprising:
presenting filtered recommendations to user A through a display of a user interface coupled to the personal recommender system by employing a colour encoding for encoding a respective assumed like-degree of each of the presented recommendations.

13. The method of claim 9, wherein the step of determining the relevance-taste index includes applying a learning algorithm, such as applying a neural network, a Naive Bayes classifier, or a support vector machine.

14. The method of claim 13, wherein applying the learning algorithm includes taking into account a warning relating to a content item, which has been submitted through the contact account, the warning indicating a contact's dislike with respect to the content item.

15. The method of claim 9, further comprising the step of:
generating a colour overlay for displaying the filtered recommendations in order to indicate a respective assumed like-degree $\lambda$ (A, x), wherein a degree of colour saturation used to overlay a given content item is a function of $\lambda$ (A, x).

16. A non-transitory storage medium storing a computer program for operating a recommender system, the computer program comprising program code means for causing the recommender system to carry out the steps of claim 9, when the computer program is run on a computer controlling the recommender system.

\* \* \* \* \*